(12) United States Patent
Lippka

(10) Patent No.: US 12,449,074 B2
(45) Date of Patent: Oct. 21, 2025

(54) PIPE COUPLING

(71) Applicant: Tyco Fire Products LP, Lansdale, PA (US)

(72) Inventor: Sandra M. Lippka, Warwick, RI (US)

(73) Assignee: Tyco Fire Products LP, Cranston, RI (US)

( * ) Notice: Subject to any disclaimer, the term of this patent is extended or adjusted under 35 U.S.C. 154(b) by 232 days.

(21) Appl. No.: 17/610,357

(22) PCT Filed: May 12, 2020

(86) PCT No.: PCT/IB2020/054492
§ 371 (c)(1),
(2) Date: Nov. 10, 2021

(87) PCT Pub. No.: WO2020/230029
PCT Pub. Date: Nov. 19, 2020

(65) Prior Publication Data
US 2022/0221093 A1 Jul. 14, 2022

Related U.S. Application Data

(60) Provisional application No. 62/847,372, filed on May 14, 2019.

(51) Int. Cl.
*F16L 23/08* (2006.01)

(52) U.S. Cl.
CPC .................... *F16L 23/08* (2013.01)

(58) Field of Classification Search
CPC ......... F16L 17/04; F16L 21/06; F16L 21/065; F16L 23/08
See application file for complete search history.

(56) References Cited

U.S. PATENT DOCUMENTS 3,251,615 A 5/1966 Short
3,352,582 A * 11/1967 Mankin .................. F16L 3/127
403/56

(Continued)

FOREIGN PATENT DOCUMENTS

WO WO-2008/009871 1/2008

OTHER PUBLICATIONS

International Search Report and Written Opinion on International Application No. PCT/IB2020/054492, mail date Jul. 22, 2020, 12 pages.

*Primary Examiner* — Zachary T Dragicevich
*Assistant Examiner* — Alexander T Rufrano
(74) *Attorney, Agent, or Firm* — Foley & Lardner LLP

(57) ABSTRACT

A pipe coupling has a housing, a mounting portion extending away from a first side of the housing, and a hinge portion extending away from a second side of the housing. The housing is defined by a first axial wall, a second axial wall spaced apart from the first axial wall, and a semi-cylindrical outer surface extending between the first axial wall and the second axial wall. Each of the first axial wall and second axial wall have a semi-annular shape defining a passage radially inward from the first axial wall and second axial wall. The mounting portion has a flange and a hole formed through the flange. The hinge portion includes a tab and a frame. The tab extends partially between the first axial wall and the second axial wall, and the frame also extends partially between the first axial wall and the second axial wall.

19 Claims, 12 Drawing Sheets

(56) References Cited

U.S. PATENT DOCUMENTS

| | | | |
|---|---|---|---|
| 4,373,235 A | | 2/1983 | Korgaonkar |
| 4,940,261 A | * | 7/1990 | Somers Vine .......... F16L 23/08 |
| | | | 285/112 |
| 5,018,768 A | * | 5/1991 | Palatchy ................. F16L 23/10 |
| | | | 285/24 |
| 6,076,861 A | | 6/2000 | Ikeda |
| 6,139,069 A | * | 10/2000 | Radzik .................... F16L 23/04 |
| | | | 285/112 |
| 6,254,040 B1 | | 7/2001 | Mc Grath |
| D482,956 S | | 12/2003 | Pyron |
| 6,892,990 B2 | * | 5/2005 | Pisczak .................. H02G 7/053 |
| | | | 248/62 |
| 9,169,952 B2 | * | 10/2015 | Horgan ................. F16B 5/0275 |
| 10,958,059 B2 | * | 3/2021 | Ahlisch .................... H02G 7/14 |
| 11,448,346 B2 | * | 9/2022 | Belen ..................... F16L 21/065 |
| 2018/0163905 A1 | | 6/2018 | Ohnemus et al. |
| 2021/0247007 A1 | * | 8/2021 | Artsiely ................. F16J 15/106 |
| 2021/0262595 A1 | * | 8/2021 | Zhang ................... F16L 21/065 |

* cited by examiner

PIPE COUPLING

CROSS-REFERENCE TO RELATED APPLICATIONS

The present application is the National Stage of International Application No. PCT/IB2020/054492, filed May 12, 2020, which claims the benefit of and priority to U.S. Provisional Application No. 62/847,372, title "PIPE COUPLING," filed May 14, 2019, the disclosure of which is incorporated herein by reference in its entirety.

BACKGROUND

Pipe couplings can be used in pipe installations to secure two pipe ends together. The pipe couplings can create a fluidic seal between pipe ends using a gasket.

SUMMARY

At least one aspect relates to a coupling. The coupling has a housing, a mounting portion extending away from a first side of the housing, and a hinge portion extending away from a second side of the housing. The housing is defined by a first axial wall, a second axial wall spaced apart from the first axial wall, and a semi-cylindrical outer wall extending between the first axial wall and the second axial wall. Each of the first axial wall and second axial wall have a semi-annular shape defining a passage radially inward from the first axial wall and second axial wall. The mounting portion has a flange and a hole formed through the flange. The hinge portion includes a tab and a frame. The tab extends partially between the first axial wall and the second axial wall, and the frame also extends partially between the first axial wall and the second axial wall.

At least one aspect relates to a pipe coupling. The pipe coupling includes a first coupling segment and a second coupling segment hingedly coupled to the first coupling segment. The first coupling segment has a first pipe housing, a first hinge portion, and a first mounting portion. The first hinge portion has a first tab and a first frame extending away from a first side of the first pipe housing. The first mounting portion extends away from a second side of the first pipe housing opposite the first side. The second coupling segment has a second pipe housing, a second hinge portion, and a second mounting portion. The second hinge portion has a second tab and a second frame extending away from a first side of the second pipe housing. The second mounting portion extends away from a second side of the second pipe housing opposite the first side.

At least one aspect relates to a pipe coupling kit. The pipe coupling kit includes a first coupling segment, a second coupling segment, a threaded bolt, and a nut sized to threadably engage the threaded bolt. The first coupling segment has a first pipe housing, a first hinge portion, and a first mounting portion. The first hinge portion has a first tab and a first frame extending away from a first side of the first pipe housing. The first mounting portion extends away from a second side of the first pipe housing opposite the first side. The second coupling segment has a second pipe housing, a second hinge portion, and a second mounting portion. The second hinge portion includes a second tab and a second frame extending away from a first side of the second pipe housing. The second mounting portion extends away from a second side of the second pipe housing opposite the first side. The threaded bolt is sized to extend through a first aperture formed in the first mounting portion and a second aperture formed in the second mounting portion. The pipe coupling kit can include a gasket, which can enable the assembled pipe coupling to form a water-tight, pressure resistant joint.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

DETAILED DESCRIPTION

Figure 1:
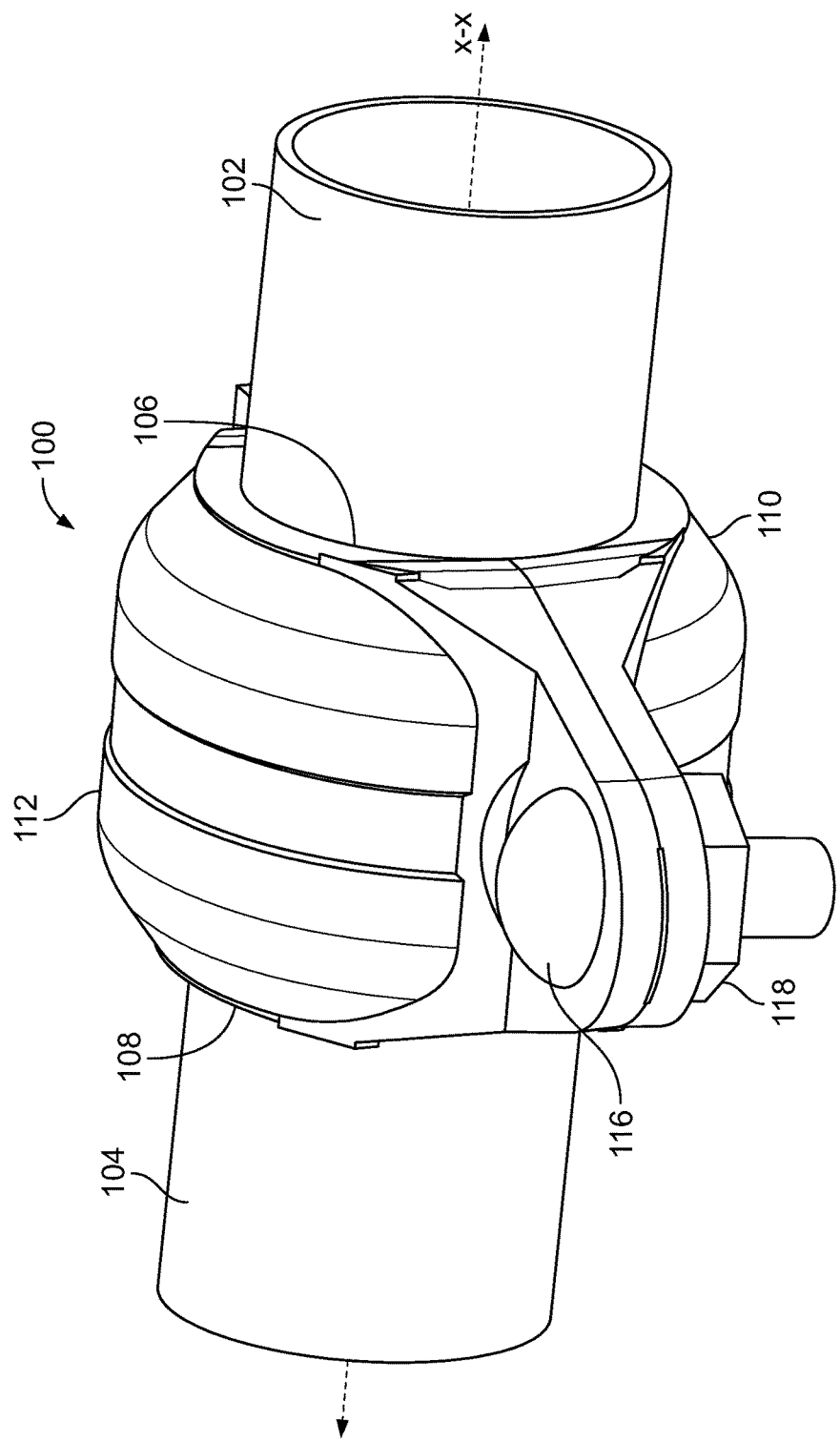
FIG. 1 is a perspective view of an example of a pipe coupling received around and forming a seal between two pipe segments.

Following below are more detailed descriptions of various concepts related to, and implementations of pipe couplings. Pipe couplings can be used to connect ends of pipes with one another. The various concepts introduced above and discussed in greater detail below can be implemented in any of numerous ways, including in sprinkler systems.

Pipe couplings can include two pieces that can receive and secure ends of pipes, and can establish a fluid connection between the ends of the pipes. A gasket can be provided in the pipe coupling to seal the connection between the ends of the pipes. The pieces can be connected with one another by a hinge at a first end, and secured around the pipes using a fastener, such as a nut and bolt assembly that can pass through openings in the two pieces. In order to connect with one another, the two pieces may be made from different structures (e.g., using different castings).

A pipe coupling in accordance with the present disclosure can be made, generally, of two identical or substantially identical coupling segments that can be hingedly coupled to one another to rotate between an open position and a closed position. The hinged coupling formed between the two coupling segments can be made by a split tab and window arrangement on each coupling segment. A tab on each coupling segment can engage a window formed in the other coupling segment, enabling the coupling segments to be identical or substantially identical. The collective engagement between tabs and windows can form a hinged connection that allows relative rotation between the coupling segments. Relative rotation between the coupling segments can transition the coupling segments between an open, or separated position and a closed, or engaged position. The pipe coupling can be easily positioned over a gasket that receives the two grooved or flared pipe segments. The pipe coupling assembly can then be rotated to the closed position to compress the gasket and form a secure, leak-free coupling connection between the pipe segments. Fasteners, such as a threaded bolt and nut, can be used to provide additional clamping force and ensure that the coupling segments remain in the closed position when a pipe seal is desired.

By having two identical or substantially identical (e.g., differing in dimension within traditional casting tolerances) coupling segments, the manufacturing time and costs associated with couplings can be reduced, such as by enabling a single casting to be used to manufacture the coupling segments. The amount of tooling to create pipe couplings according to the disclosure can be reduced, and delays associated with changing out molds (e.g., to form couplings having two different segments) can be eliminated. Inventory for additional tooling and component storage can be reduced as well, which can reduce the manufacturing burden associated with producing the pipe couplings according to the disclosure. The split tab and window hinge formed between coupling segments can reduce the amount of fasteners used to secure the pipe coupling around a pipe joint, which can reduce size and weight requirements and enable a more efficient pipe coupling assembly process. The pipe coupling can be assembled (e.g., subsequent to manufacturing) by inserting the gasket into the two coupling segments (the gasket may be slightly oversized, such that an outer diameter of the gasket is greater than an inner diameter of the pipe coupling when the pipe coupling is closed), and engaging the bolt and the nut with the coupling segments. The pipe coupling can be installed at a pipe joint by a single user by holding the coupling open, inserting the pipes (e.g., ends of the pipes), and tightening the bolt and the nut (or other fastener as applicable).

Referring now to FIG. 1, a pipe coupling 100 is depicted forming a fluidic seal between two adjacent pipes 102, 104. The pipe coupling 100 can join two pipe ends 106, 108 in axial alignment about a central axis X-X, for example. The pipe ends 106, 108 can be of any fluid carrying structure, such as for example, the ends of respective pipes 102, 104, a pipe fitting (not shown), a valve (not shown), or a fire protection sprinkler (not shown). The pipe coupling 100 can be used with grooved or flared piping and/or tubing, for example.

The pipe coupling 100 includes two coupling segments 110, 112 hingedly coupled together. As explained in additional detail below, each of the coupling segments 110, 112 can be identical or substantially identical (e.g., differing in dimension within sand-casting tolerances; having dimension or geometric differences within a threshold percentage, such as one percent, five percent, or ten percent) components. The coupling segments 110, 112 can be made from cast iron or bronze. A gasket can be positioned in a cavity 114 (see, e.g., FIG. 10) can be positioned between the pipe ends 106, 108 to provide additional sealing between pipes 102, 104. The gasket can be received between the two coupling segments 110, 112, which can compress the gasket radially. The gasket can also be compressed axially by the pipe ends 106, 108 to provide sufficient leak-free sealing between the pipes 102, 104. The gasket can be any of a variety of gaskets that can facilitate sealing of the pipe coupling 100. One or more fasteners can be used to mount the coupling segments 110, 112 together to secure the pipe coupling 100 in place. For example, a threaded bolt 116 and threaded nut 118 can be used in combination to secure the coupling segments 110, 112 together.

The shape and orientation of the coupling segments 110, 112 are depicted in FIGS. 2-6. As depicted, the coupling segment 110 includes a housing 120 that can receive a portion of the gasket, for example. The housing 120 is defined by a first axial wall 122 and a second axial wall 124 spaced apart from the first axial wall 122. A semi-cylindrical wall 126 extends between the first axial wall 122 and the second axial wall 124 to define a portion of the outer shape of the coupling segment 110.

The first axial wall 122 and the second axial wall 124 can each have a semi-annular shape. A base 128, 130 of each axial wall 122, 124 extends inwardly away from the semi-cylindrical wall 126. For example, the bases 128, 130 can extend orthogonally away from the semi-cylindrical wall 126, parallel to one another. Ends 132, 134 of each axial wall 122, 124 opposite each base 128, 130 together define a passage 136 (e.g., a semi-circular passage) extending through the housing 120. The semi-circular passage 136 can be sized to receive a portion of a pipe 102, 104, for example. A portion of each axial wall 122, 124 can be disposed within the grooves formed in the ends of grooved pipes, which can help secure the pipe coupling 100 axially between the two pipes 102, 104. The semi-circular passage 136 can be formed concentrically with the semi-cylindrical wall 126. The combination of the axial walls 122, 124 and an inner surface 138 of the semi-cylindrical wall 126 define a cavity 140 within the housing 120. The inner surface 138 of the semi-cylindrical wall 126 creates a trough-like shape within the interior of the coupling segment 110 that can receive, for example, the gasket and/or pipe 102, 104. The first axial wall 122 and second axial wall 124 can define a passage 136 having an oval or elliptical shape. The ends 132, 134 of each axial wall 122, 124 can be defined by a radius (or several radii) that varies as it extends across the coupling segment 110, 112.

The interior of the coupling segment 110 can also interact with and receive a second coupling segment 112 to create a complete pipe coupling 100. Each of the first axial wall 122 and the second axial wall 124 can include a tiered structure. For example, the first axial wall 122 includes an outer section 142 and an inner section 144 each extending away from the base 128. The outer section 142 of the first axial wall 122 is defined by two, spaced apart surfaces 146, 148. The surfaces 146, 148 can be coplanar, for example. A curved wall 150 extends between the two surfaces 146, 148, concentric with the cylindrical wall 126 and partially defining the semi-circular passage 136. Alternatively, the curved wall 150 can be defined by a varying radius, or several radii of different sizes (e.g., when the passage 136 is non-circular), and does not need to be positioned concentric with the cylindrical wall 126. The curved wall 150 can be sized to extend into and engage a groove formed within a grooved pipe 102, 104, for example. The two surfaces 146, 148 can be coplanar with a main, coupling surface 152 formed on the coupling segment 110.

The inner section 144 of the first axial wall 122 is formed axially inward from the outer section 142. The inner section 144 is defined by two offset surfaces 154, 156 and a curved wall 158 extending between the two offset surfaces 154, 156. The curved wall 158 is positioned radially outward from the curved wall 150 of the outer section 142. The curved wall 158 of the inner section 144 and the curved wall 150 of the outer section 142 can be concentric with one another and concentric with the cylindrical wall 126. The curved wall 158 can also form a sunken portion of the semi-circular passageway 136. The curved wall 158 can be sized to receive and engage the nominal outer surface of a grooved pipe 102, 104, adjacent to the groove, for example. Like the curved wall 150, the curved wall 158 can be defined by a varying radius or several radii of different sizes, such that the passage 136 can define an oval, elliptical, or other type shape suitable to couple pipes or fittings.

Figure 2:
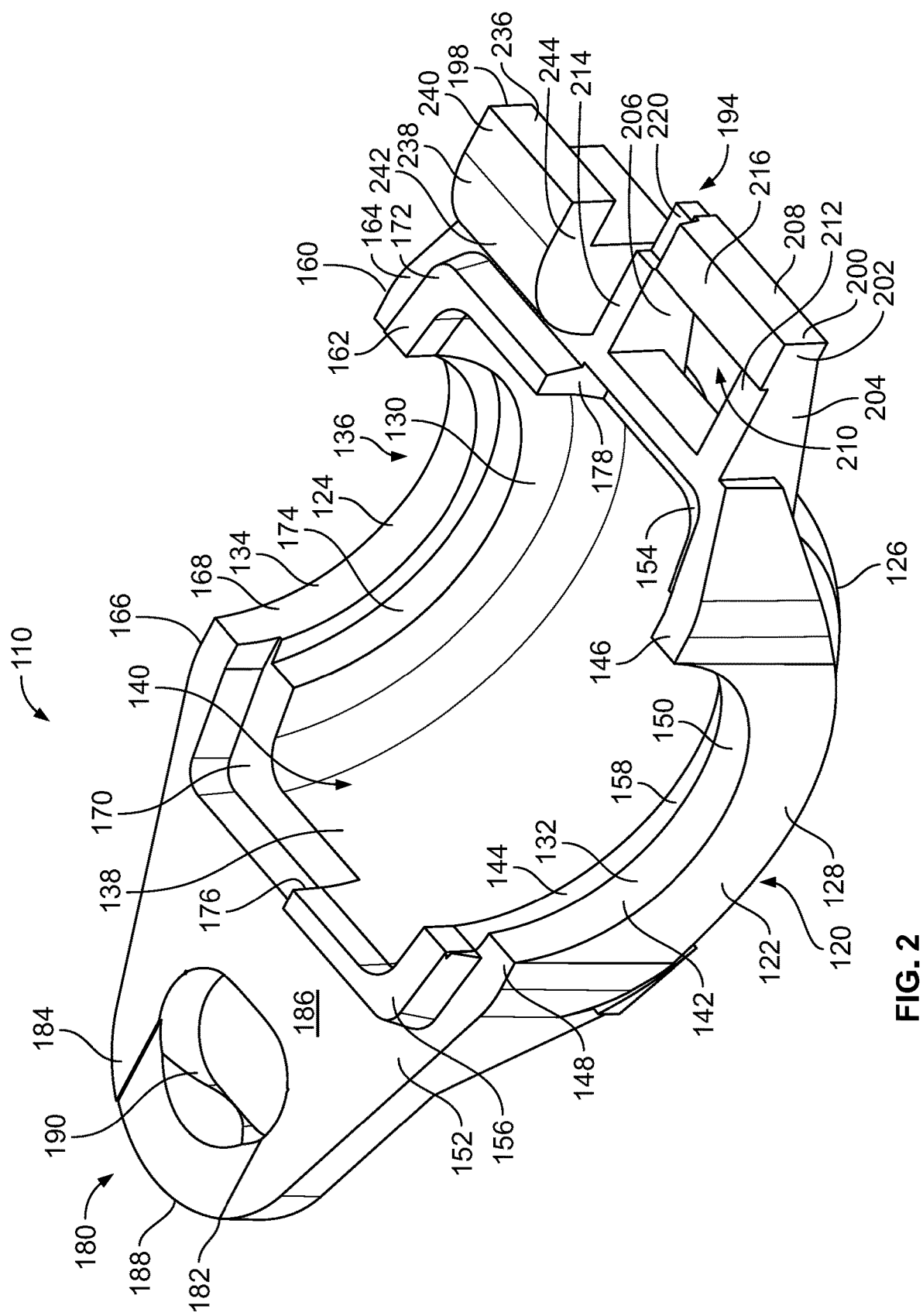
FIG. 2 is a top perspective view of an example of a coupling segment of a pipe coupling, shown in isolation.
Figure 3:
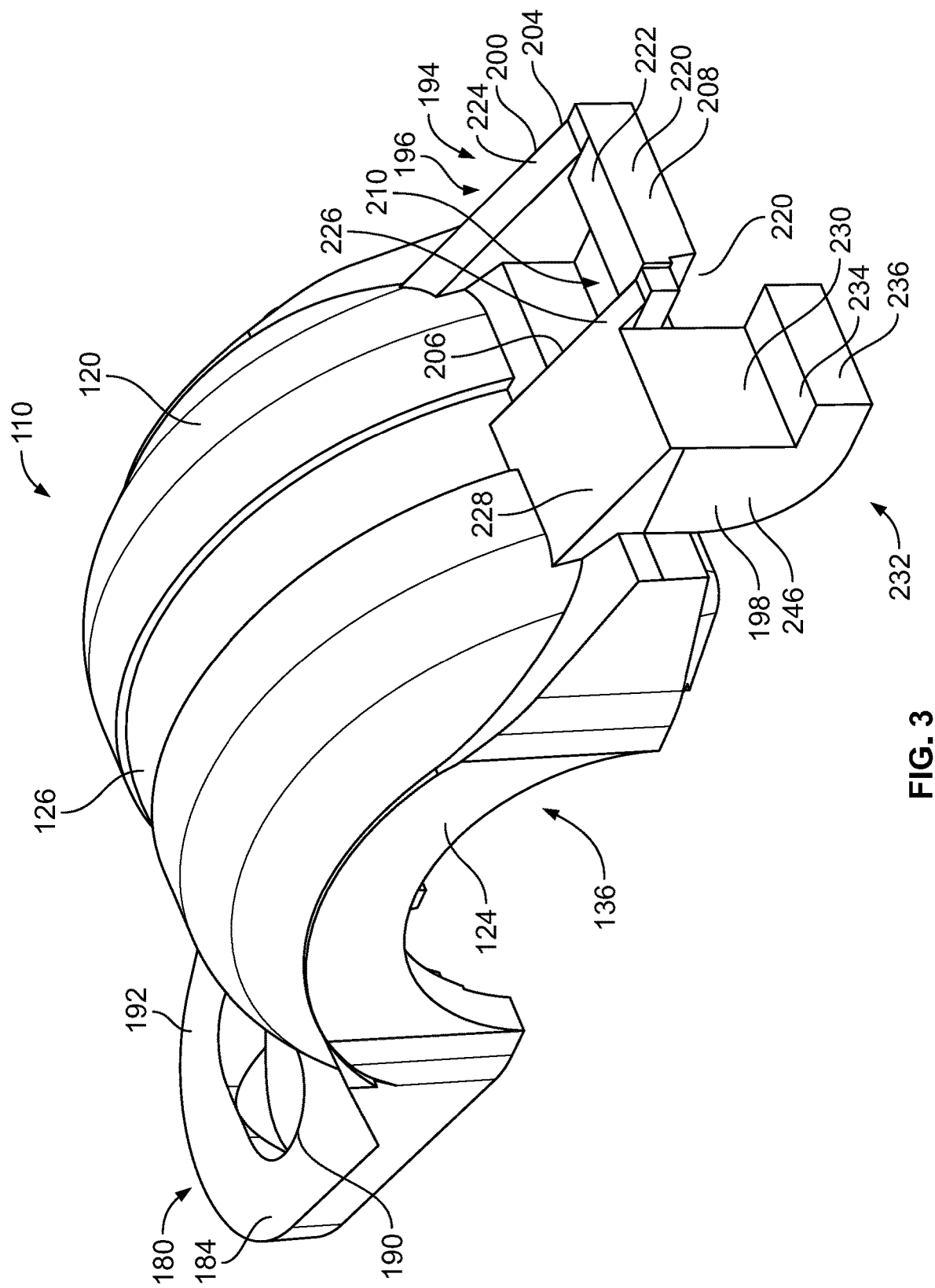
FIG. 3 is a bottom perspective view of an example of a coupling segment.
Figure 4:
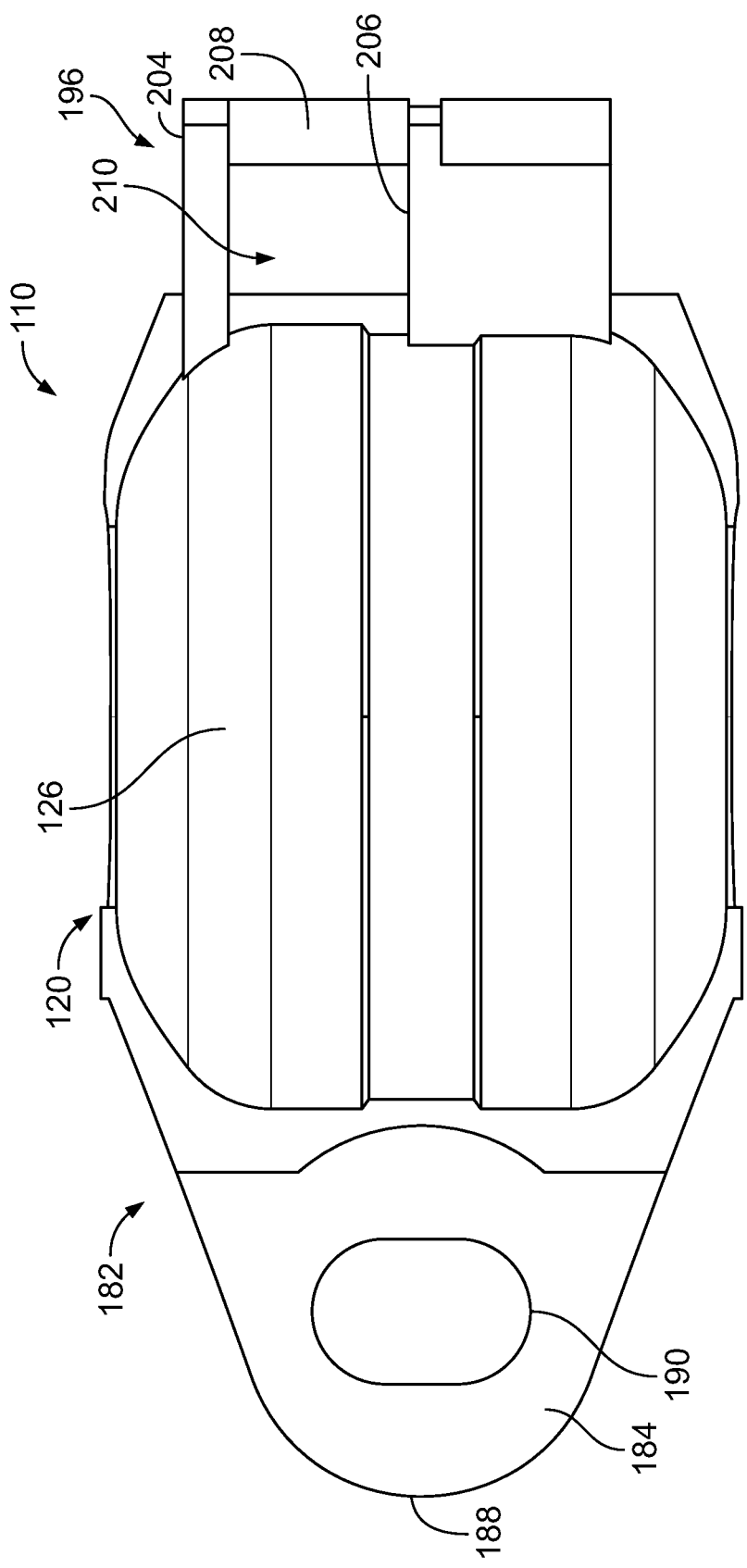
FIG. 4 is a bottom view of an example of a coupling segment.
Figure 5:
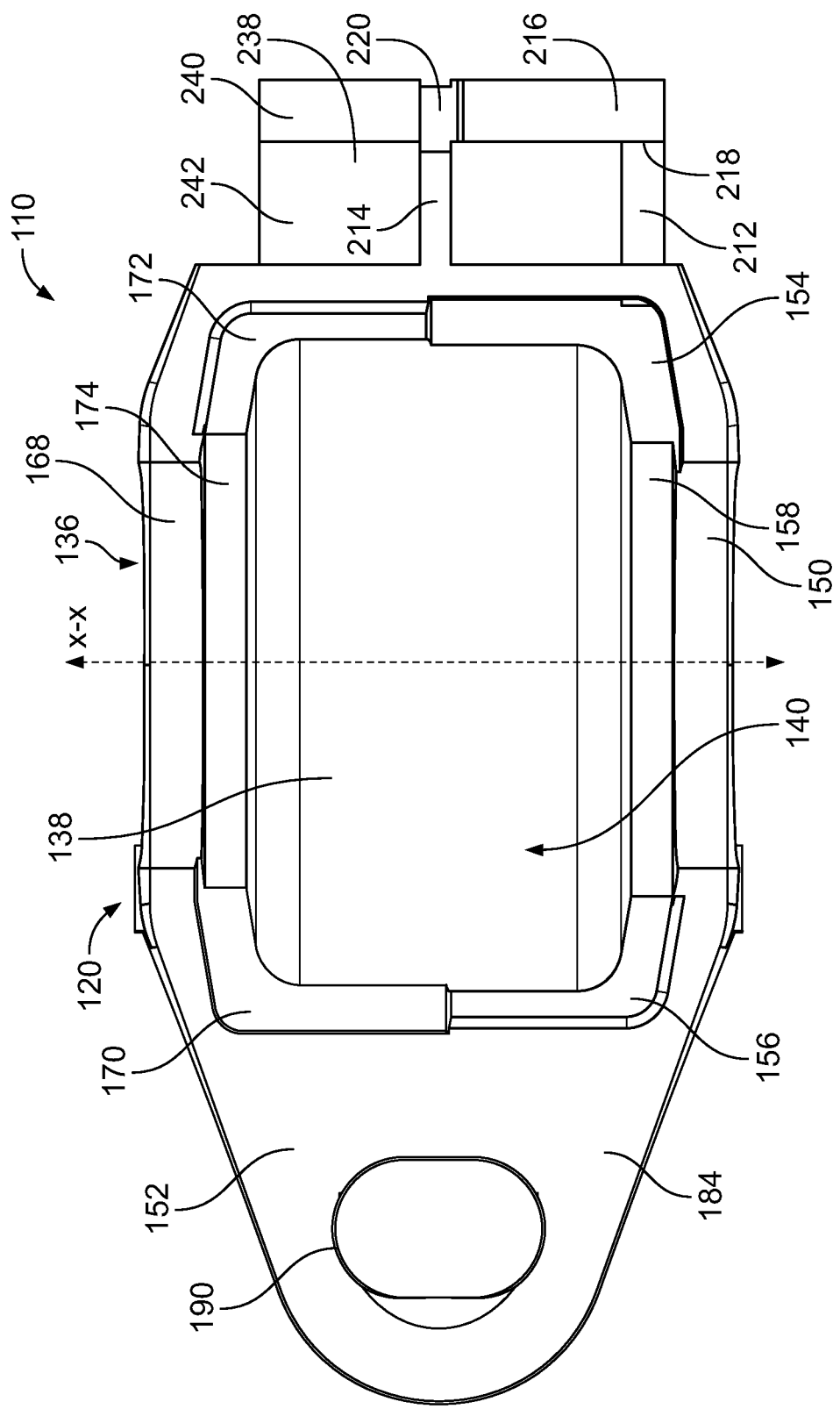
FIG. 5 is a top view of an example of a coupling segment.
Figure 6:
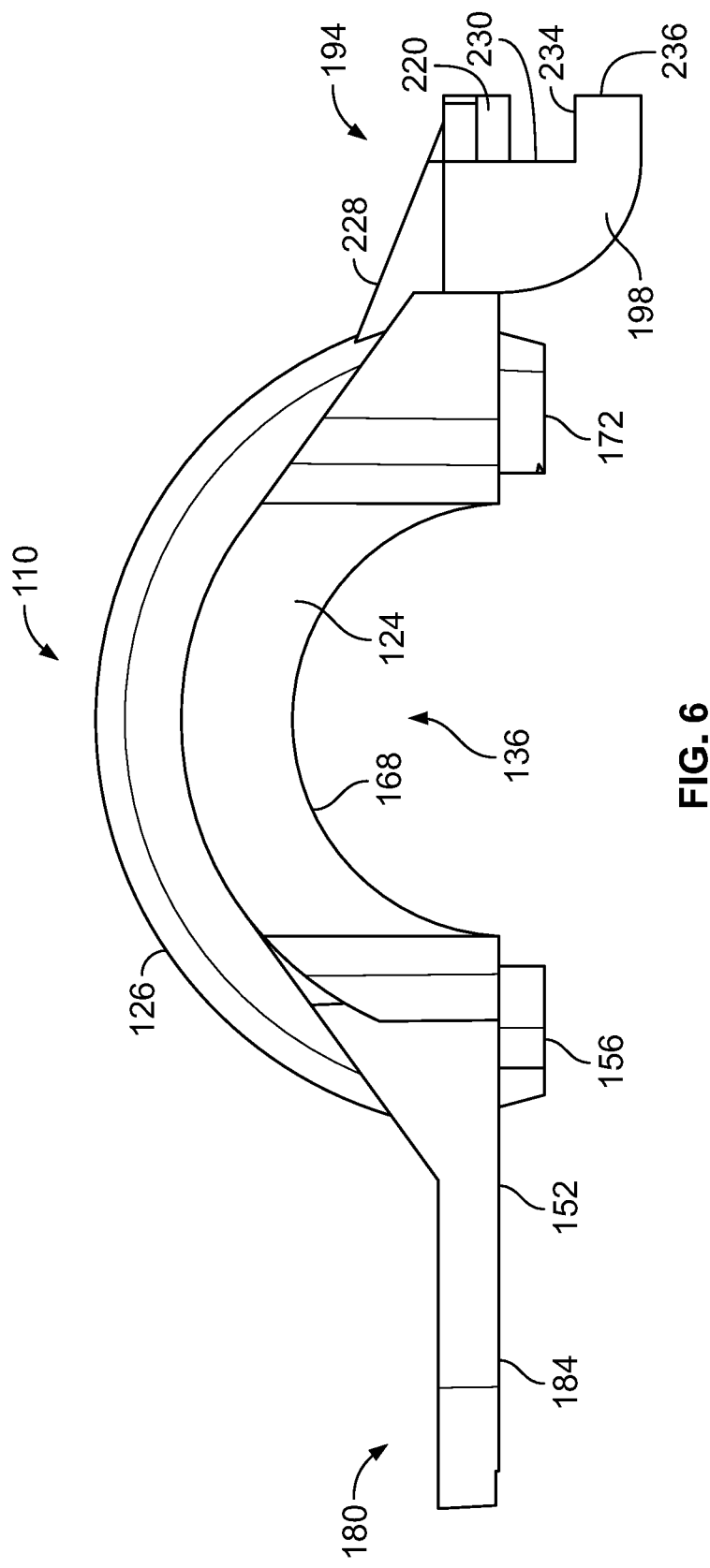
FIG. 6 is an inverted front view of an example of a coupling segment.

The offset surfaces 154, 156 can receive and engage complimentary offset surfaces formed in the second coupling segment 112. As depicted in FIG. 2, the first offset surface 154 is positioned away from the base 128, at a position below the surfaces 146, 148 of the outer wall and below the main coupling surface 152. The second offset surface 156 is positioned away from the base 128, at a position above the surfaces 146, 148 and above the main coupling surface 152. The offset surfaces 154, 156 can be approximately parallel with one another. The offset surfaces 154, 156 can also extend approximately parallel to the surfaces 146, 148 and the main coupling surface 152. The offset surfaces 154, 156 can each have an L-shape that includes both an axial component and a radial component.

The second axial wall 124 has the same general tiered structure as the first axial wall 122. The second axial wall 124 includes an outer section 160 and an inner section 162 each extending away from the base 130. The outer section 160 includes surfaces 164, 166 extending approximately coplanar with one another. The surface 166 can be coplanar with the main coupling surface 152 or at various angles relative to the main coupling surface 152. A curved wall 168 extends between the surfaces 164, 166, and is positioned approximately concentric with the curved wall 150 on the first axial wall 122. The inner section 162 of the second axial wall 124 is again defined by two offset surfaces 170, 172 and a curved wall 174 extending between the two offset surfaces 170, 172. The offset surface 170 extends to a location adjacent with the offset surface 156 of the first axial wall 122, creating a first step 176 between the offset surfaces 156, 170. Similarly, the offset surface 172 extends to a location adjacent with the offset surface 154 of the first axial wall 122, creating a second step 178 between the offset surfaces 154, 172. The first step 176 and second step 178 together provide a combined male and female connection that can be used to engage and secure the second coupling segment 112. Each of the offset surfaces 154, 156, 170, 172 in the housing 120 can be approximately equally (e.g., +/−10%) sized.

Figure 11:
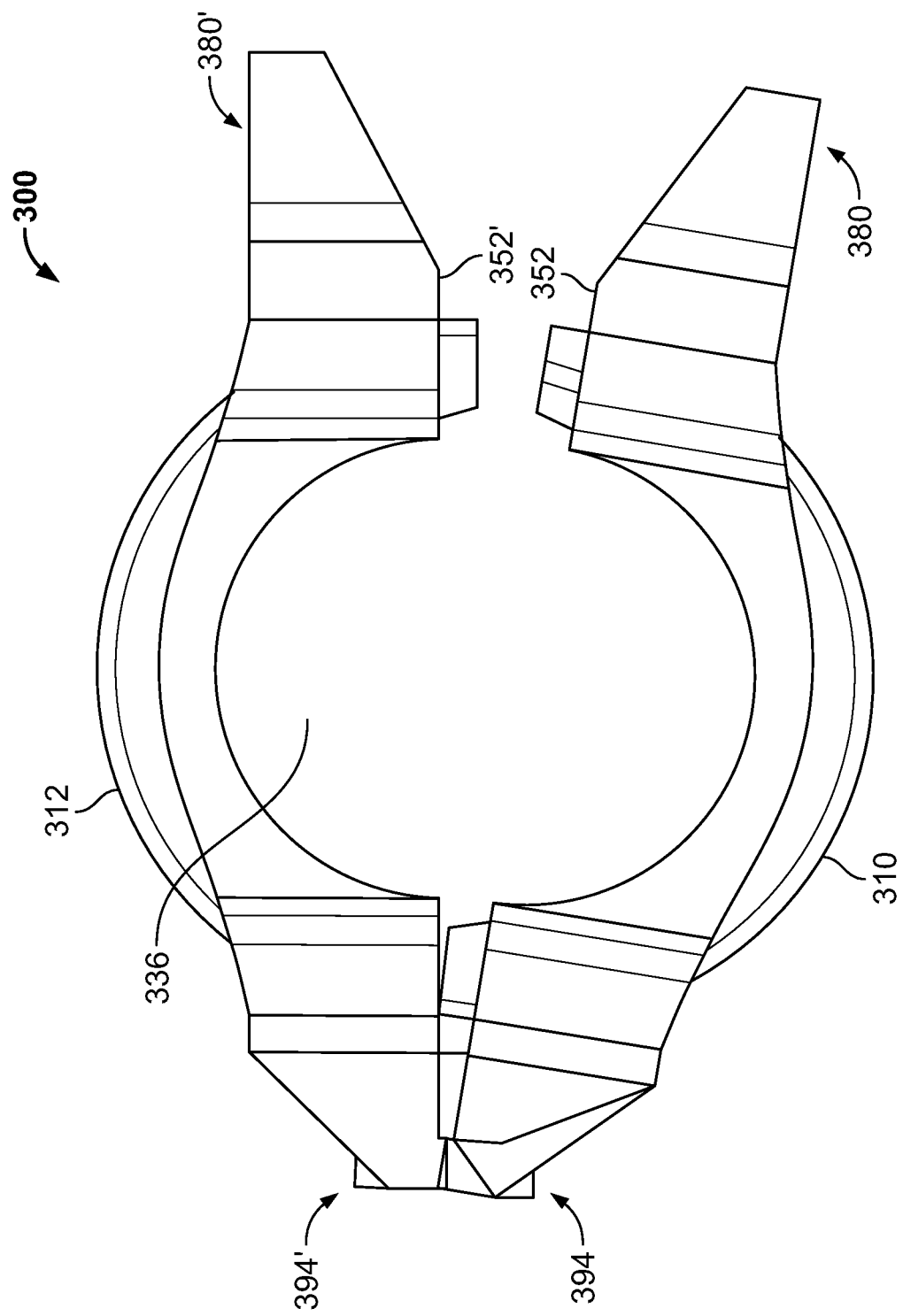
FIG. 11 is a perspective view of an example of a pipe coupling.

A mounting portion 180 extends away from a first side 182 of the housing 120. The mounting portion 180 includes a flange 184 that can be used to secure the first coupling segment 110 to the second coupling segment 112. The flange 184 can be partially defined by a substantially planar inner surface 186 that is coplanar and continuous with a portion of the main coupling surface 152. The flange 184 can taper inwardly as it extends away from the semi-cylindrical wall 126 to form a triangular shape. A distal end 188 of the flange 184 can be rounded. In some examples, a portion (not shown) of the flange 184 can be angled (e.g., at about 45 degrees) as depicted in FIG. 11.

A hole 190 is formed through the flange 184. The hole 190 can receive fasteners, such as the threaded bolt 116 described above. The hole 190 can be defined by an elongate oval shape extending through the flange 184. An outer surface 192 of the flange 184 can be a substantially planar mounting surface that can receive and support a fastener head or nut 118, for example. A partial counterbore can be formed in the cylindrical wall 126 proximate the hole 190 to accommodate fastener heads or nuts 118.

A second side 196 of the housing 120 supports a hinge portion 194 that can form a hinge arrangement with the second coupling segment 112. By locating a hinge on one side of the pipe coupling 100, the number of fasteners needed to assemble and install the pipe coupling 100 can be reduced. The split hinged pipe coupling 100 can simplify the installation process by enabling the use of a single bolt to secure the pipe coupling 100, which can make it easier to properly tighten the pipe coupling 100 with less opportunity for error (e.g., as compared to multi-bolt systems which may need multiple iterations of tightening on each bolt). By having two like components, inventory needs can be reduced. Manufacturing time can be improved drastically by eliminating the need to switch out molds and tooling to create multiple different parts. Cast iron or bronze, for example, can be readily molded into each of the coupling segments 110, 112.

The hinge portion 194 extends away from the second side 196 of the housing 120, opposite the mounting portion 180. The hinge portion 194 includes a tab 198 and a frame 202 defining a window 200 (e.g., opening) extending outwardly away from the semi-cylindrical wall 126. The tab 198 and window 200 each extend a portion of the axial distance (e.g., distance along axis x-x depicted in FIG. 5) between the first axial wall 122 and the second axial wall 124. The tab 198 can be aligned outside the second offset surface 156, while the window 200 can be aligned outside the first offset surface 170. The tab 198 can extend less than half the axial distance between the first axial wall 122 and the second axial wall 124, for example. The window 200 extends between the first axial wall 122 and the second axial wall 124 further than the tab 198 extends between the first axial wall 122 and the second axial wall 124. The window 200 can then receive a tab 198' from the second coupling segment 112 to form a portion of a hinge joint.

The frame 202 (e.g., window frame) can include a first arm 204 extending away from the housing 120, a second arm 206 extending away from the housing 120, and a cross-member 208 extending between the arms 204, 206. The first arm 204 and second arm 206 can extend away from the housing 120 approximately parallel to one another. The cross-member 208 can extend perpendicularly between the two arms 204, 206 to form a window cavity 210 having a rectangular shape. Each of the arms 204, 206 can include flat surfaces 212, 214 extending approximately coplanar with the main coupling surface 152. The cross-member 208 can be partially defined by a surface 216 having a slight vertical offset from the flat surfaces 212, 214, which forms a step 218 between the cross-member 208 and the arms 204, 206. A notch 220 can be formed in the between the second arm 206 and the cross-member 208 as well. The notch 220 helps to locate the second coupling segment 112 relative to the first coupling segment 110. The notch 220 also provides additional clearance below the tab 198, which allows a second window 200' on the second coupling segment 112 to be positioned beneath the tab 198 prior to coupling. In this position, rotation of the second coupling segment 112 moves the tab 198 into the second window 200' and moves a second tab 198' on the second coupling 112 into the window 200 to create a rotatable, hinged coupling between the two coupling segments 110, 112.

Each of the arms 204, 206 can have a triangular shape that tapers inward as it extends away from the housing 120. The cross-member 208 can have an outer surface 222 that angles away from an outer surface 224, 226 of each arm 204, 206. The outer surface 222 of the cross member 208 can face away from and extend parallel to the flat surfaces 212, 214 of each arm 204, 206 and the main coupling surface 152.

The tab 198 can extend away from the frame 202 of the window 200. The outer surface 226 of the second arm 206 can be continuous with an outer surface 228 of the tab 198. The outer surface 228 of the tab 198 can angle away from the housing 120 toward the main coupling surface 152, parallel to the outer surfaces 224, 226 of each arm 204, 206. The outer surface 228 of the tab 198 can extend out from the housing 120 to a location approximately aligned with the cross-member 208 and notch 220.

A first window engaging surface 230 extends away from the outer surface 228 of the tab 198. The first window engaging surface 230 can angle away from the outer surface 228, approximately orthogonal (e.g., +/−5 degrees) to the main coupling surface 152. The first window engaging surface 230 can extend upward, above the second offset surface 156. The first window engaging surface 230 can be rectangular, for example.

A foot 232 of the tab 198 extends outwardly away from the first window engaging surface 230. The foot 232 can extend orthogonally away from the first window engaging surface 230 to form a second window engaging surface 234 and an outermost surface 236. The second window engaging surface 234 can extend approximately parallel to the main coupling surface 152, for example. The outermost surface 236 can extend orthogonally away from the second window engaging surface 234, approximately parallel to the first window engaging surface 230. The outermost surface 236, second window engaging surface 234, and first window engaging surface 230 can each be defined by a common width smaller than the lateral distance between the first arm 204 and the second arm 206 of the frame 202. As discussed below, each of the outermost surface 236, the second window engaging surface 234, and the first window engaging surface 230 can be entirely or partially received within the window cavity 210' of the second coupling segment 112.

A guiding surface 238 extends away from the outermost surface 236 to the main coupling surface 152. The guiding surface 238 can be a curved surface that can slide relative to the frame 202 and housing 120. The curved shape of the guiding surface 238 can allow at least some degree of relative rotation between coupling segments 110, 112, even when coupled together. The guiding surface 238 can be entirely cylindrical. The guiding surface 238 can include a flat portion 240 and a curved portion 242 extending smoothly and tangentially away from the flat portion 240. The flat portion 240 can extend approximately parallel to the second window engaging surface 234, for example. The curved portion 242 may extend away from the flat portion 240 at a location approximately coplanar with the first window engaging surface 230. The curved portion 242 of the guiding surface 238 can be formed as a quadrant of a cylinder.

The tab 198 can include an inside surface 244 and an outside surface 246. The outside surface 246 can extend orthogonally away from the outermost surface 236, the second window engaging surface 234, and the first window engaging surface 230, for example. Similarly, the inside surface 244 can extend orthogonally away from the outermost surface 236, the second window engaging surface 234, and the first window engaging surface 230, parallel to the outside surface 246. The inside surface 244 can extend away from the second arm 206 of the frame 202. The outside surface 246 can be spaced apart from the first axial wall 122.

Figure 7:
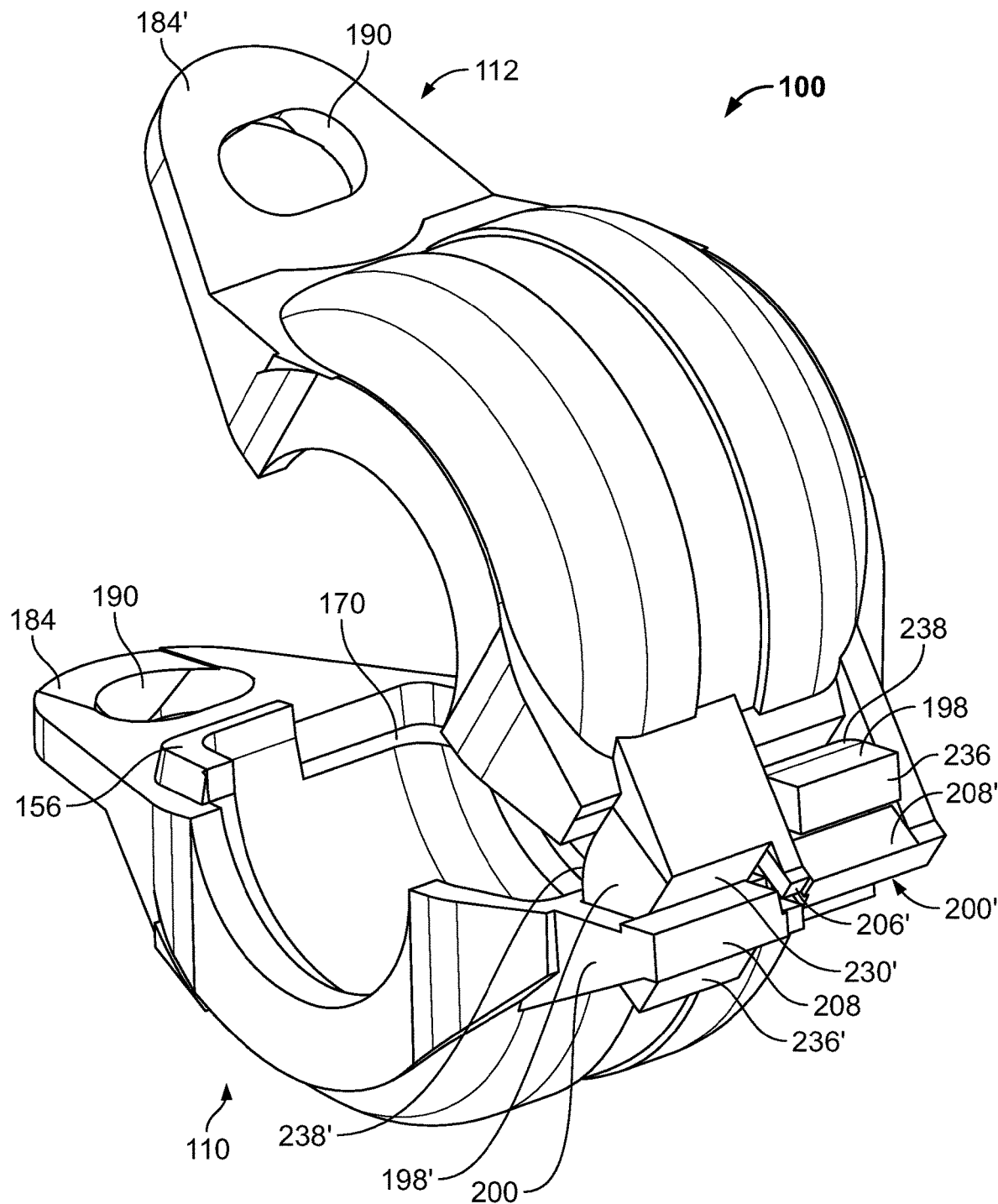
FIG. 7 is a rear perspective view of an example of a pipe coupling in an open position.
Figure 8:
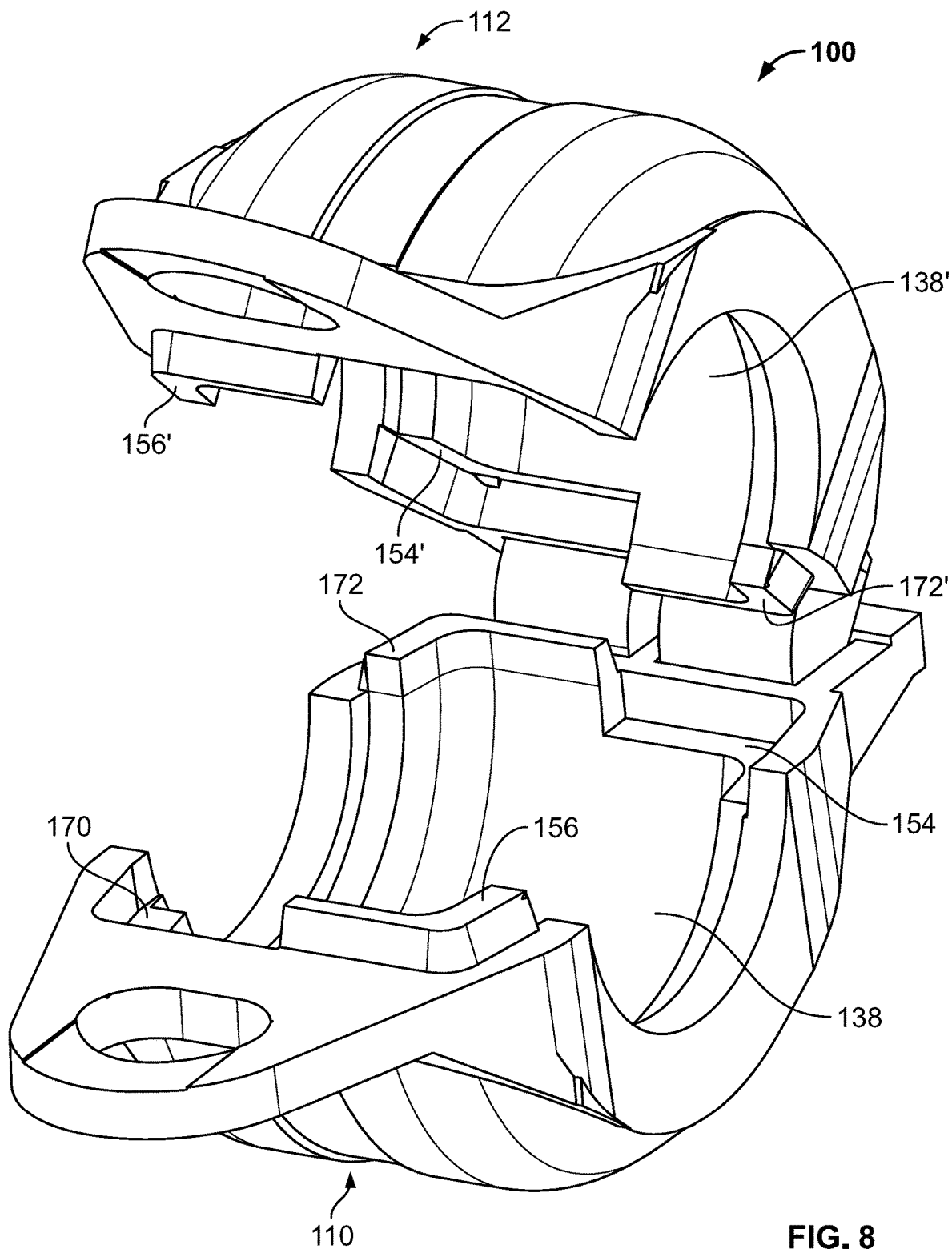
FIG. 8 is a front perspective view of an example of a pipe coupling.
Figure 9A:
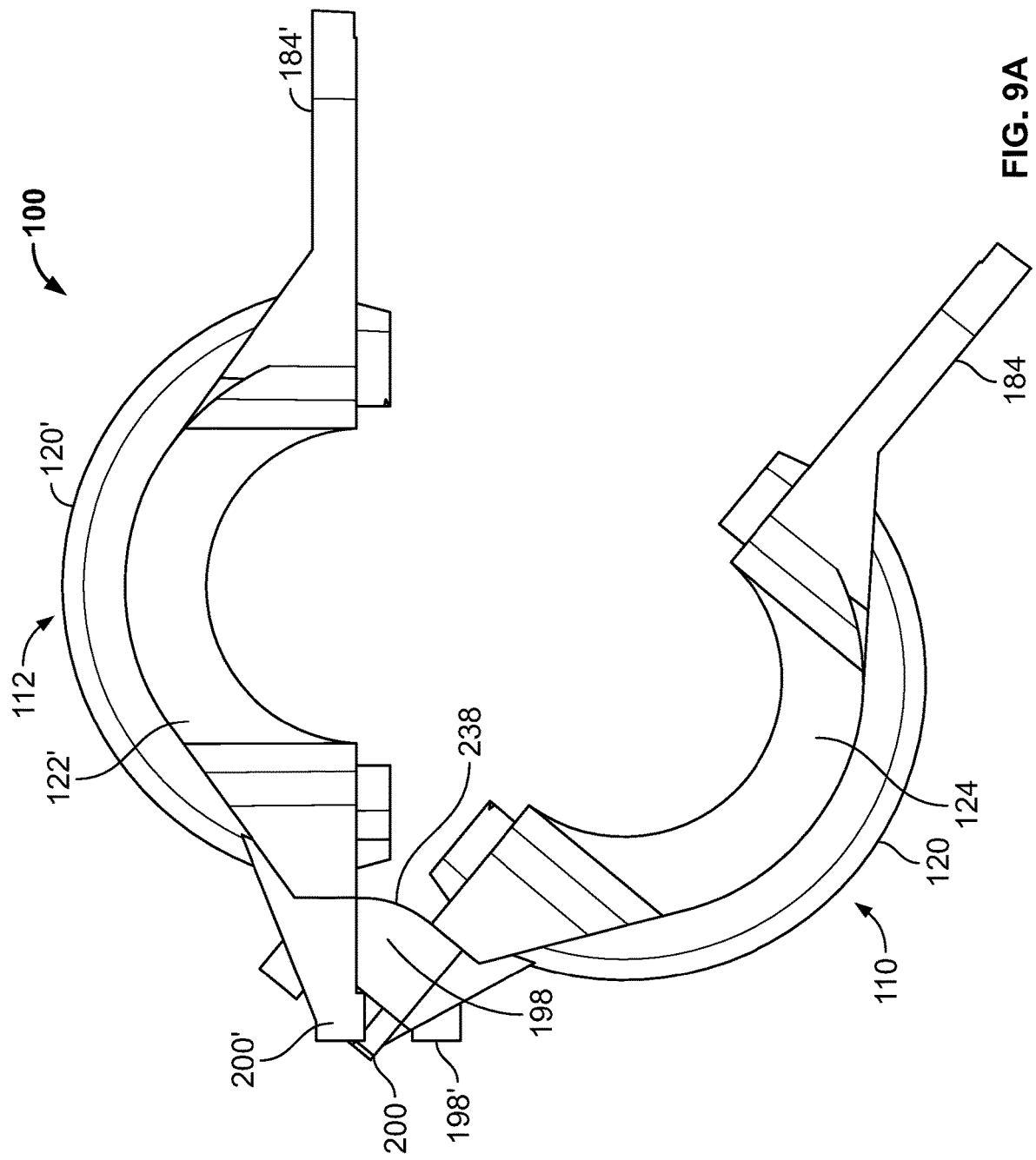
FIG. 9A is a front view of an example of a pipe coupling.
Figure 9B:
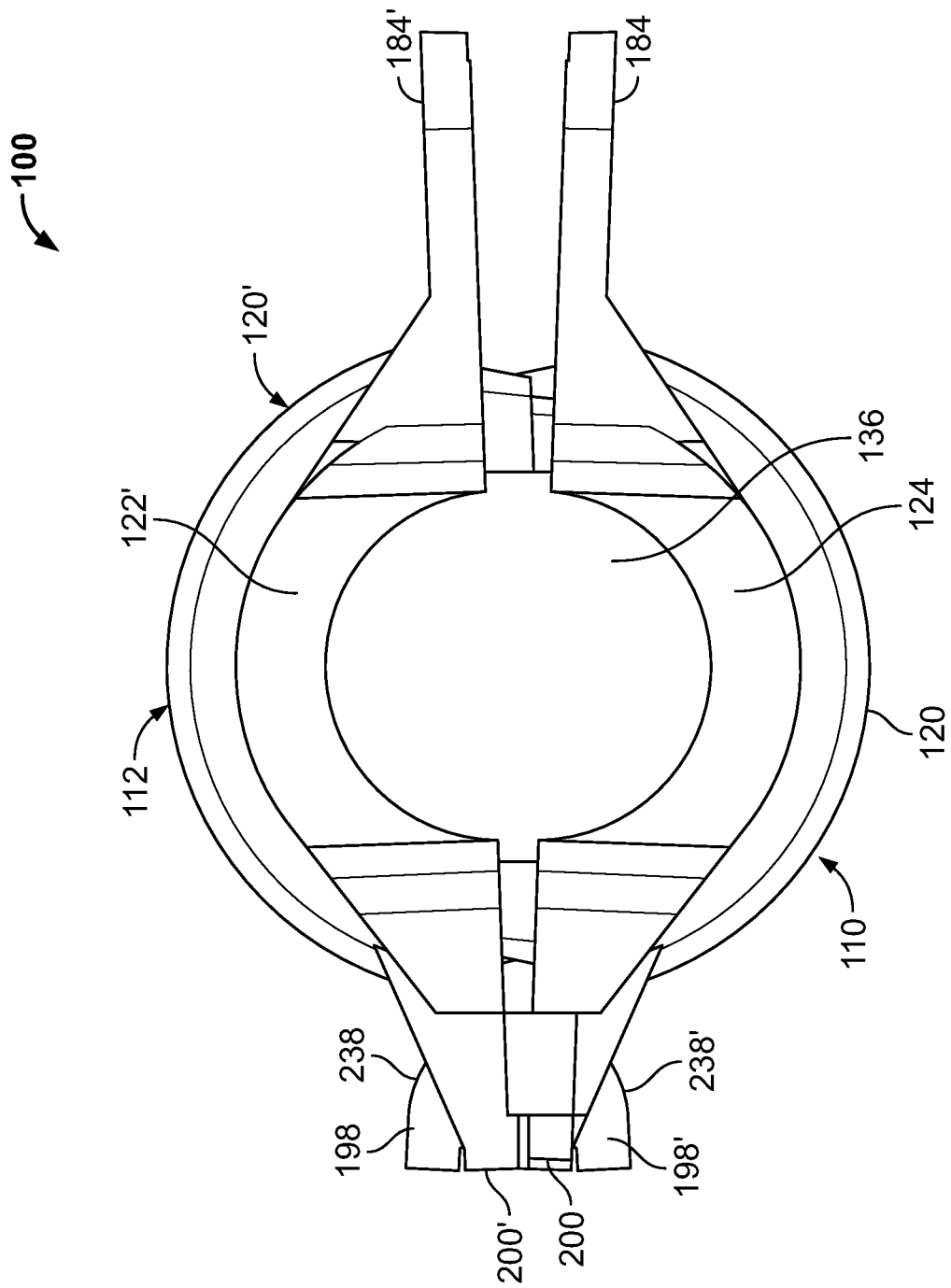
FIG. 9B is a front view of an example of a pipe coupling, rotated to a closed position.
Figure 10:
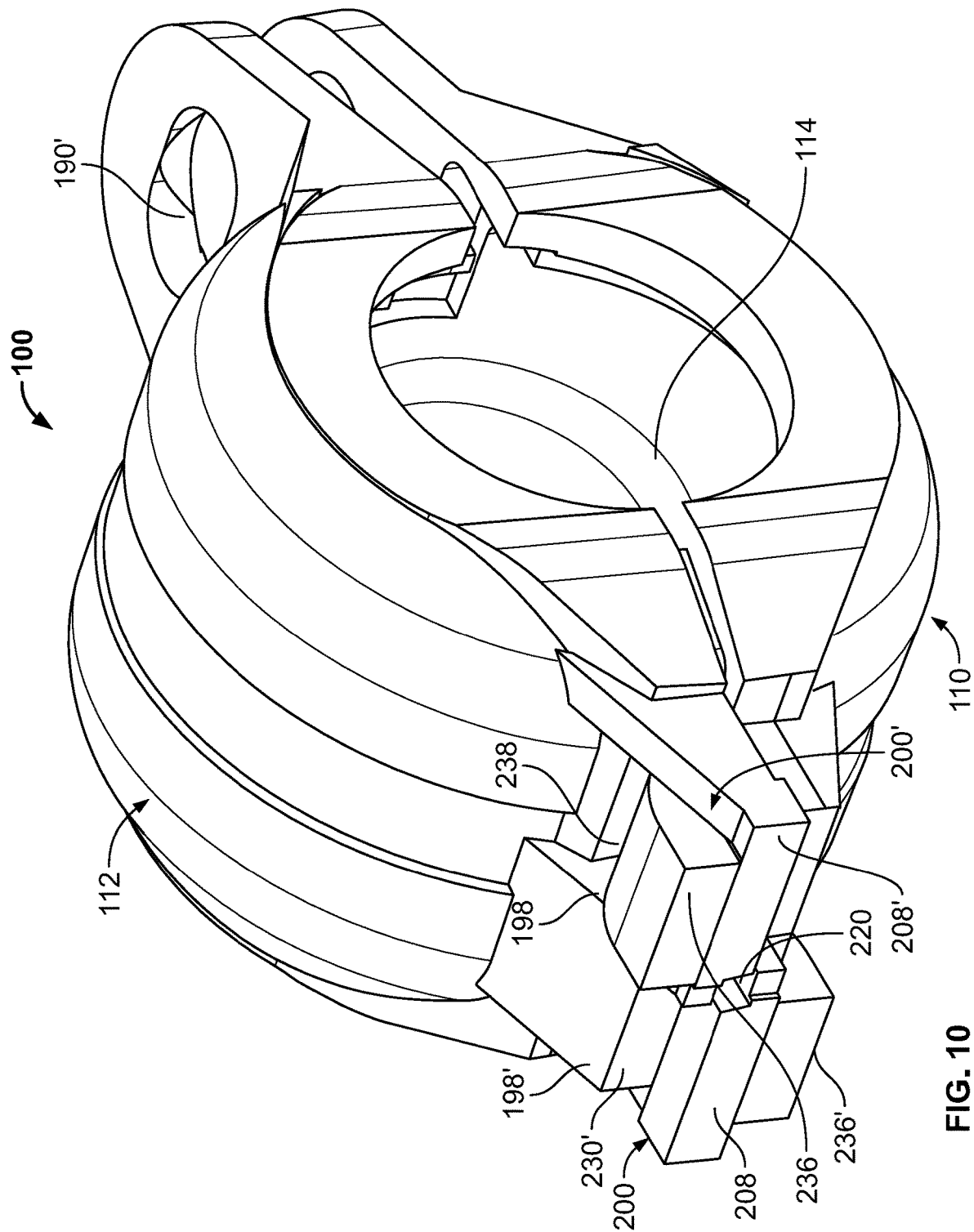
FIG. 10 is a rear perspective view of an example of a pipe coupling.

As depicted in FIGS. 7-8, the split tab 198 and window 200 arrangement on the first coupling segment 110 can be removably coupled to the split tab 198' and window 200' arrangement in the second coupling segment 112 to form the pipe coupling 100. To create a hinged coupling between the coupling segments 110, 112, the coupling segments 110, 112 can first be positioned so that the first tab 198 is aligned with the second window 200' and the first window 200 is aligned with the second tab 198'. The coupling segments 110, 112 can be pushed toward one another, so that a portion of the second arm 206' of the second coupling segment 112 slides into the first notch 220 on the first coupling segment 110. The outermost surface 236' of the second coupling segment 112 can engage the first window engaging surface 230 of the first coupling segment 110, which in turn causes the outermost surface 236 of the first coupling segment 110 to engage the first window engaging surface 230' of the second coupling segment 112. Rotating the coupling segments 110, 112 inward, toward one another rotates the first tab 198 into the second window 200' and rotates the second tab 198' into the first window 200. Continued inward rotation of the coupling segments 110, 112 brings the tabs 198, 198' into engagement with the cross-members 208, 208'. The coupling segments 110, 112 can continue to rotate inward toward one another, pivoting relative to one another about the guiding surfaces 238, 238' of the tabs 198, 198' until the pipe coupling 100 is closed, as depicted in FIGS. 9B and 10.

In the closed position, the coupling segments 110, 112 engage one another in several locations. The flanges 184, 184' of each segment 110, 112 mirror one another and may engage one another. The holes 190, 190' formed through the flanges 184, 184' can be aligned to form a single passage through the pipe coupling 100. The offset surfaces 154, 156, 170, 172 each extend toward opposing offset surfaces 154', 156', 170', 172'. At the other side of the pipe coupling 100, each tab 198, 198' extends into and through a window 200, 200'. Each of the first window engaging surfaces 230, 230' and second window engaging surfaces 234, 234' engage a cross-member 208, 208'. In this orientation, a fastener (e.g., the threaded bolt 116 and nut 118) can be used to secure the two coupling segments 110, 112 in the closed orientation. The fastener can provide a necessary clamping force to create a secure coupling between the pipes 102, 104.

The hinged pipe coupling 100 can be readily installed between pipes 102, 104. In some examples, the gasket is positioned between the two coupling segments 110, 112, which may support or otherwise bias the coupling segments 110, 112 in the open orientation shown in FIG. 9A. The two pipe ends 106, 108 can then be advanced toward the hinged pipe coupling 100 from either side of the coupling 100 until the pipe ends 106, 108 contact and compress the gasket in the cavity 114. In still other examples, the gasket and coupling 100 can be positioned upon one of the pipe ends 106, 108 so that the gasket contacts the one pipe end 106, 108. The other pipe end 106, 108 can then be advanced toward the gasket and coupling 100, until each pipe end 106, 108 contacts and compresses the gasket. in still other examples, the gasket can be first placed between the two pipe ends 106, 108. The pipe coupling 100 can next be advanced toward the gasket in the open orientation shown in FIG. 9A. The pipe ends 106, 108 and gasket can be received within the housings 120, 120'. In each example, the pipe coupling 100 can be rotated inward, to the closed position shown in FIG. 9B, once the gasket has been compressed between the two pipe ends 106, 108. The threaded bolt 116 and nut can then be passed through the holes 190, 190' formed through the flanges 184, 184' and clamped together to form a leak-proof seal between the pipes 102, 104, as depicted in FIG. 1. Although described as pipe ends 106, 108, ends of fittings (e.g., sprinkler heads, valves, etc.) can also be coupled to one of the pipes 102, 104 using the pipe coupling in the same or similar manner described above.

Variations to the coupling 100 and coupling segments 110, 112 can be made to create additional couplings within the scope of the present disclosure. As depicted in FIG. 11, a pipe coupling 300 can be formed by two identical or substantially identical coupling segments 310, 312 having different geometries, sizes, and features than the coupling segments 110, 112. For example, the mounting portions 380, 380' of each coupling segment 310, 312 can extend away from one another, rather than parallel to one another. The clamping force from the fastener is directed inward, toward the pipes 102, 104 and the main mounting surface 352 where the mounting portions 380, 380' still contact one another. A similar split tab and window hinge portion 394, 394' can be formed between the two coupling segments 310, 312 as well.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the pipe coupling as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A coupling, comprising:
   a housing comprising:
      a first axial wall around an axis, the first axial wall having a first outer section and a first inner section, the first inner section comprising a first surface, a second surface, and a curved wall between the first surface and the second surface, the curved wall is outward from the axis relative to the first outer section, the first surface is at a different distance from the axis than the second surface;
      a second axial wall spaced apart from the first axial wall such that the first inner section is between the first outer section and the second axial wall and the first surface and the second surface each comprise a surface portion extending toward the second axial wall; and
      an outer surface extending between the first axial wall and the second axial wall, the first axial wall and second axial wall each having a semi-annular shape defining a passage radially inward from the first axial wall and the second axial wall;
   a mounting portion extending away from a first side of the housing, the mounting portion having a flange and a hole formed through the flange; and
   a hinge portion extending away from a second side of the housing, the hinge portion including a tab extending partially between the first axial wall and the second axial wall and a frame extending partially between the first axial wall and the second axial wall, the frame comprising a first arm, a second arm, a cross-member between the first arm and the second arm, and a notch between the second arm and the cross-member, the notch directly between the cross-member and the tab.

2. The coupling of claim 1, comprising:
the tab extends less than half an axial distance between the first axial wall and the second axial wall.

3. The coupling of claim 1, comprising:
the frame extends between the first axial wall and the second axial wall further than the tab extends between the first axial wall and the second axial wall.

4. The coupling of claim 1, comprising:
the passage is defined by semi-circular recesses formed in each of the first axial wall and the second axial wall.

5. The coupling of claim 1, comprising:
the passage is concentric with the first axial wall and the second axial wall.

6. The coupling of claim 1, comprising:
the hole formed through the flange is elongated.

7. The coupling of claim 1, comprising:
a continuous, planar surface extends from the tab to the frame.

8. The coupling of claim 1, comprising:
the first arm and the second arm are spaced apart and angled away from the housing, and the first arm and the second arm comprise flat surfaces that are coplanar with an upper surface of the tab.

9. The coupling of claim 1, comprising:
the notch positioned to provide clearance below the tab.

10. A pipe coupling, comprising:
a first coupling segment having:
  a first pipe housing,
  a first hinge portion having a first tab and a first frame extending away from a first side of the first pipe housing, the first frame comprising a first arm, a second arm, a cross-member between the first arm and the second arm, and a notch between the second arm and the cross-member, the notch directly between the cross-member and the tab;
  a first mounting portion extending away from a second side of the first pipe housing opposite the first side; and
  an axial wall from the first hinge portion to the first mounting portion, the axial wall having a first outer section and a first inner section, the first inner section comprising a first surface, a second surface, and a curved wall between the first surface and the second surface, the curved wall is outward from an axis of the first coupling segment relative to the first outer section, the first surface is at a different distance from the axis than the second surface, the first surface and the second surface each comprise a surface portion extending away from the first outer section; and
  a second coupling segment hingedly coupled to the first coupling segment, the second coupling segment having a second pipe housing, a second hinge portion having a second tab and a second frame extending away from a first side of the second pipe housing, and a second mounting portion extending away from a second side of the second pipe housing opposite the first side of the second pipe housing.

11. The pipe coupling of claim 10, comprising:
the first coupling segment is hingedly coupled to the second coupling segment by inserting the first tab into the second frame and inserting the second tab into the first frame.

12. The pipe coupling of claim 10, comprising:
the first coupling segment is identical to the second coupling segment.

13. The pipe coupling of claim 10, comprising:
a first hole is formed through the first mounting portion and a second hole is formed through the second mounting portion, and the first hole and second hole are at least partially aligned with one another.

14. The pipe coupling of claim 10, comprising:
the first tab extends away from the first side of the first pipe housing by a first distance, and the first frame extends away from the first side of the first pipe housing by a second distance greater than the first distance.

15. The pipe coupling of claim 10, comprising:
a threaded fastener and nut, the threaded fastener extending through the first mounting portion and the second mounting portion and engaging one of the first mounting portion and the second mounting portion, and the nut coupled to the threaded fastener and engaging one of the first mounting portion and the second mounting portion.

16. The pipe coupling of claim 10, comprising:
the first tab includes an interior side and an exterior side, the interior side being defined by a curved surface and the exterior side being defined by at least two orthogonal surfaces.

17. A pipe coupling kit, comprising:
a first coupling segment having a first pipe housing around an axis, a first hinge portion having a first tab and a first frame extending away from a first side of the first pipe housing, a first mounting portion extending away from a second side of the first pipe housing opposite the first side, and an axial wall from the first hinge portion to the first mounting portion, the axial wall having a first outer section and a first inner section, the first inner section comprising a first surface, a second surface, and a curved wall between the first surface and the second surface, the curved wall is outward from the axis relative to the first outer section, the first surface is at a different distance from the axis than the second surface, the first surface and the second surface each comprise a surface portion extending away from the first outer section, the first frame comprising a first arm, a second arm, a cross-member between the first arm and the second arm, and a notch between the second arm and the cross-member, the notch directly between the cross-member and the tab;
a second coupling segment having a second pipe housing, a second hinge portion having a second tab and a second frame extending away from a first side of the second pipe housing, and a second mounting portion extending away from a second side of the second pipe housing opposite the first side of the second pipe housing;
a threaded bolt sized to extend through a first aperture formed in the first mounting portion and a second aperture formed in the second mounting portion; and
a nut sized to threadably engage the threaded bolt.

18. The pipe coupling kit of claim 17, comprising:
a gasket sized to seal the first pipe housing and the second pipe housing.

19. The pipe coupling kit of claim 17, comprising:
the first coupling segment and the second coupling segment are cast iron or bronze components.

* * * * *